US006327679B1

(12) United States Patent
Russell (10) Patent No.: US 6,327,679 B1
(45) Date of Patent: Dec. 4, 2001

(54) RELOCATING UNRELIABLE DISK SECTORS WHEN ENCOUNTERING DISK DRIVE READ ERRORS WITH NOTIFICATION TO USER WHEN DATA IS BAD

(75) Inventor: Barry Lowell Russell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/604,131

(22) Filed: Jun. 27, 2000

Related U.S. Application Data (62) Division of application No. 09/283,365, filed on Mar. 31, 1999, now Pat. No. 6,247,152.

(51) Int. Cl.$^7$ .............................. G11C 29/00; G11B 20/00
(52) U.S. Cl. ........................ 714/710; 714/770; 369/53.1
(58) Field of Search .................................. 714/710, 723, 714/769, 770, 771, 763, 42, 54, 703; 360/135; 711/100, 162, 202, 206; 369/53.1, 275.3

(56) References Cited

U.S. PATENT DOCUMENTS

| | | | |
|---|---|---|---|
| 3,771,143 | 11/1973 | Taylor | 340/172.5 |
| 4,434,487 | 2/1984 | Rubinson et al. | 371/10 |
| 4,525,839 | 7/1985 | Nozawa et al. | 371/38 |
| 4,656,532 | 4/1987 | Greenberg et al. | 360/48 |
| 4,774,700 | * 9/1988 | Satoh et al. | 369/54 |
| 4,907,226 | 3/1990 | Endo | 371/10.1 |
| 4,914,529 | * 4/1990 | Bonke | 360/48 |
| 5,075,804 | 12/1991 | Deyring | 360/49 |
| 5,088,081 | 2/1992 | Farr | 369/54 |
| 5,105,427 | 4/1992 | Ando | 371/40.1 |
| 5,166,936 | 11/1992 | Ewert et al. | 371/21.6 |
| 5,189,566 | 2/1993 | Christensen et al. | 360/53 |
| 5,253,256 | 10/1993 | Oyama et al. | 371/40.1 |
| 5,287,363 | 2/1994 | Wolf et al. | 371/21.1 |
| 5,313,626 | 5/1994 | Jones et al. | 395/575 |
| 5,420,730 | 5/1995 | Moon et al. | 360/77.08 |
| 5,422,890 | 6/1995 | Klingsporn et al. | 371/21.6 |
| 5,438,560 | * 8/1995 | Lee | 369/58 |

(List continued on next page.)

OTHER PUBLICATIONS

Blind Head Scrub Error Recovery Procedure for Magnetic Tape Subsysem, IBM Technical Disclosure Bulletin, vol. 35, No. 3, Aug. 1992, pp. 408–409.

Automatic Swap of the Primary and Secondary Mirrors in a Disk Mirror system, IBM Technical Disclosure Bulletin, vol. 36, No. 12, Dec. 1993, pp. 85–86.

Write Retry Success Sector Verification in Error Recovery Steps, IBM Technical Disclosures Bulletin, vol. 38, No. 12, Dec. 1995, p. 45.

Retry Success Sector Read Verification in Idle Mode, IBM Technical Disclosure Bulletin, vol. 38, No. 12, Dec. 1995, p. 433.

Raid with Automatic Defect Detection

*Primary Examiner*—Christine T. Tu
(74) *Attorney, Agent, or Firm*—Jeffrey S. LaBaw; Bracewell & Patterson, L.L.P.

(57) ABSTRACT

When a read to a disk returns an error for a sector previously identified as good, the read is retried a predetermined number of times to attempt to recover the sector data. If the sector is unrecoverable, the failed sector is relocated and an "unusable" bit associated with the replacement sector is set to indicate that the data is bad. The unusable bit indicates that the replacement sector is good, but the data contained within the replacement sector is bad. A read error is generated for subsequent reads to the replacement sector as long as the unusable bit remains set. The unusable bit is cleared after a write to or reformat of the replacement sector. The replacement sector thereafter becomes a fully functional substitute for the failed sector, containing good data. The validity of data within the replacement sector is identified at all times, allowing use of bad data to be avoided.

5 Claims, 5 Drawing Sheets

U.S. PATENT DOCUMENTS

| | | | |
|---|---|---|---|
| 5,452,147 | 9/1995 | Yamashita et al. | 360/46 |
| 5,473,753 | 12/1995 | Wells et al. | 395/182.04 |
| 5,506,977 | 4/1996 | Jones | 395/482 |
| 5,513,160 | 4/1996 | Satoh et al. | 369/47 |
| 5,600,662 | 2/1997 | Zook | 371/40.1 |
| 5,615,190 | 3/1997 | Best et al. | 369/58 |
| 5,619,723 | 4/1997 | Jones et al. | 395/823 |
| 5,632,012 | 5/1997 | Belsan et al. | 395/182.04 |
| 5,633,767 | 5/1997 | Boutaghou et al. | 36/106 |
| 5,666,335 | 9/1997 | Horibe | 369/32 |
| 5,701,220 | 12/1997 | Koriyama | 360/106 |
| 5,734,816 | 3/1998 | Niijima et al. | 395/182.06 |
| 5,740,349 | 4/1998 | Hasbun et al. | 395/182.06 |
| 5,745,326 | 4/1998 | Koriyama | 360/106 |
| 5,751,733 | 5/1998 | Glover | 371/40.3 |
| 5,751,947 | 5/1998 | Arakawa | 395/185.07 |
| 5,764,881 | 6/1998 | Yoshida | 395/182.06 |
| 5,778,167 | 7/1998 | Carrel et al. | 395/182.06 |
| 5,793,559 | 8/1998 | Shepherd et al. | 360/78.09 |
| 5,828,511 | 10/1998 | Bar | 360/69 |
| 5,841,600 | 11/1998 | Kaplan | 360/48 |
| 5,914,928 | 6/1999 | Takahashi | 369/58 |
| 5,937,435 | 8/1999 | Dobbek et al. | 711/202 |
| 6,034,831 | 3/2000 | Dobbek et al. | 360/53 |
| 6,043,945 | 3/2000 | Tsuboi et al. | 360/53 |
| 6,101,619 | 8/2000 | Shin | 714/710 |

\* cited by examiner

RELOCATING UNRELIABLE DISK SECTORS WHEN ENCOUNTERING DISK DRIVE READ ERRORS WITH NOTIFICATION TO USER WHEN DATA IS BAD

RELATED APPLICATIONS

This is a Division of application Ser. No. 09/283,365, filed on Mar. 31, 1999, now is a U.S. Pat. No. 6,247,152.

The present invention is related to the subject matter of the following commonly assigned, copending U.S. patent applications: Ser. No. 09/283,364 entitled "RECOVERING AND RELOCATING UNRELIABLE SECTORS WHEN ENCOUNTERING DISK DRIVE READ ERRORS" and filed Mar. 31, 1999; Ser. No. 09/7283,366 entitled "ABILITY TO DISTINGUISH TRUE DISK WRITE ERRORS" and filed Mar. 31, 1999; and Ser. No. 09/282,873 entitled "RELOCATING SECTORS WHEN DISK DRIVE DOES NOT RETURN DISK WRITE ERRORS" and filed Mar. 31, 1999. The content of the above-referenced applications is incorporated herein by reference.

BACKGROUND OF THE INVENTION

1. Technical Field

The present invention relates in general to disk storage media and in particular to error handling and recovery for disk storage media. Still more particularly, the present invention relates to relocating unreliable disk sectors when read errors are received while indicating to the user the status of data within a replacement sector.

2. Description of the Related Art

Many contemporary disk drives perform relocation of bad sectors to reserved replacement sectors on the drive. When a sector being written to is determined to be bad, a good replacement sector is substituted for the bad sector. However, when there are no more replacement sectors set aside by the disk drive and another sector is determined to be bad, a Write Error or a Read Error should be returned to the operating system by the drive through the adapter and/or device driver, so that some action may be taken by the operating system to preserve the data being written.

Reporting of write errors or faults by device drivers, adapters, and/or disk drives when an attempted write to the hard disk drive is unsuccessful represents the ideal situation. Under these conditions, the system or user application has an opportunity to preserve the data by writing it elsewhere. However, the error may not be detected when the data is written, the error may not be properly reported if detected, or the data may be corrupted after being written to the disk media. The first two circumstances depend on the presence, reliability, and/or thoroughness of error detection, reporting and correction mechanisms for the disk drive, adapter, and device driver. The last circumstance results from failure of the disk media for any one of a number of reasons such as head damage to the disk media, stray magnetic fields, or contaminants finding their way into the disk drive.

In situations where the data was presumed to be properly written to the disk but returns a CRC error when read, the data may not be recreatable if it was not backed up elsewhere. The unrecoverable sector may be replaced, but the user must be made aware of the correctness of the data within the sector.

It would be desirable, therefore, to provide a mechanism for replacing an unrecoverable disk sector with a replacement sector while indicating, for the user, the correctness of data within the replacement sector.

SUMMARY OF THE INVENTION

It is therefore one object of the present invention to provide improved disk storage media.

It is another object of the present invention to provide improved error handling and recovery for disk storage media.

It is yet another object of the present invention to provide a mechanism for relocating unreliable disk sectors when read errors are received while indicating to the user the status of data within a replacement sector.

The foregoing objects are achieved as is now described. When a read to a disk returns an error for a sector previously identified as good, the read is retried a pre-determined number of times to attempt to recover the sector data. If the sector is unrecoverable, the failed sector is relocated and an "unusable" bit associated with the replacement sector is set to indicate that the data is bad. The unusable bit indicates that the replacement sector is good, but the data contained within the replacement sector is bad. A read error is generated for subsequent reads to the replacement sector as long as the unusable bit remains set. The unusable bit is cleared after a write to or reformat of the replacement sector. The replacement sector thereafter becomes a fully functional substitute for the failed sector, containing good data. The validity of data within the replacement sector is identified at all times, allowing use of bad data to be avoided.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
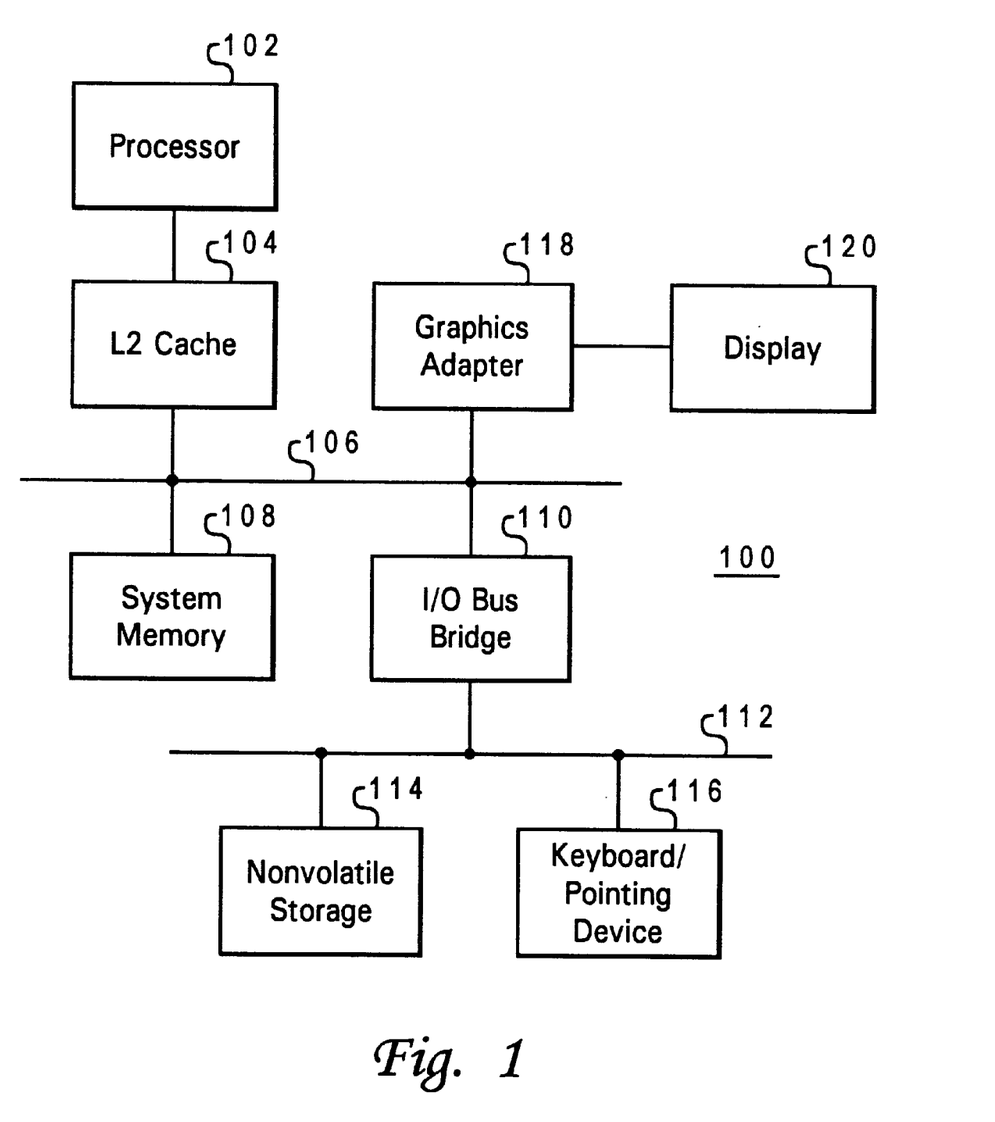
FIG. 1 depicts a block diagram of a data processing system and network in which a preferred embodiment of the present invention may be implemented.

With reference now to the figures, and in particular with reference to FIG. 1, a block diagram of a data processing system and network in which a preferred embodiment of the present invention may be implemented is depicted. Data processing system 100 may be, for example, one of the models of personal computers available from International Business Machines Corporation of Armonk, N.Y. Data processing system 100 includes a processor 102, which in the exemplary embodiment is connected to a level two (L2) cache 104, connected in turn to a system bus 106. In the exemplary embodiment, data processing system 100 includes graphics adapter 116 also connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. However, data processing system 100 is preferably programmed to provide a mechanism for replacing an unrecoverable sector with notification of the data status.

Figure 2:
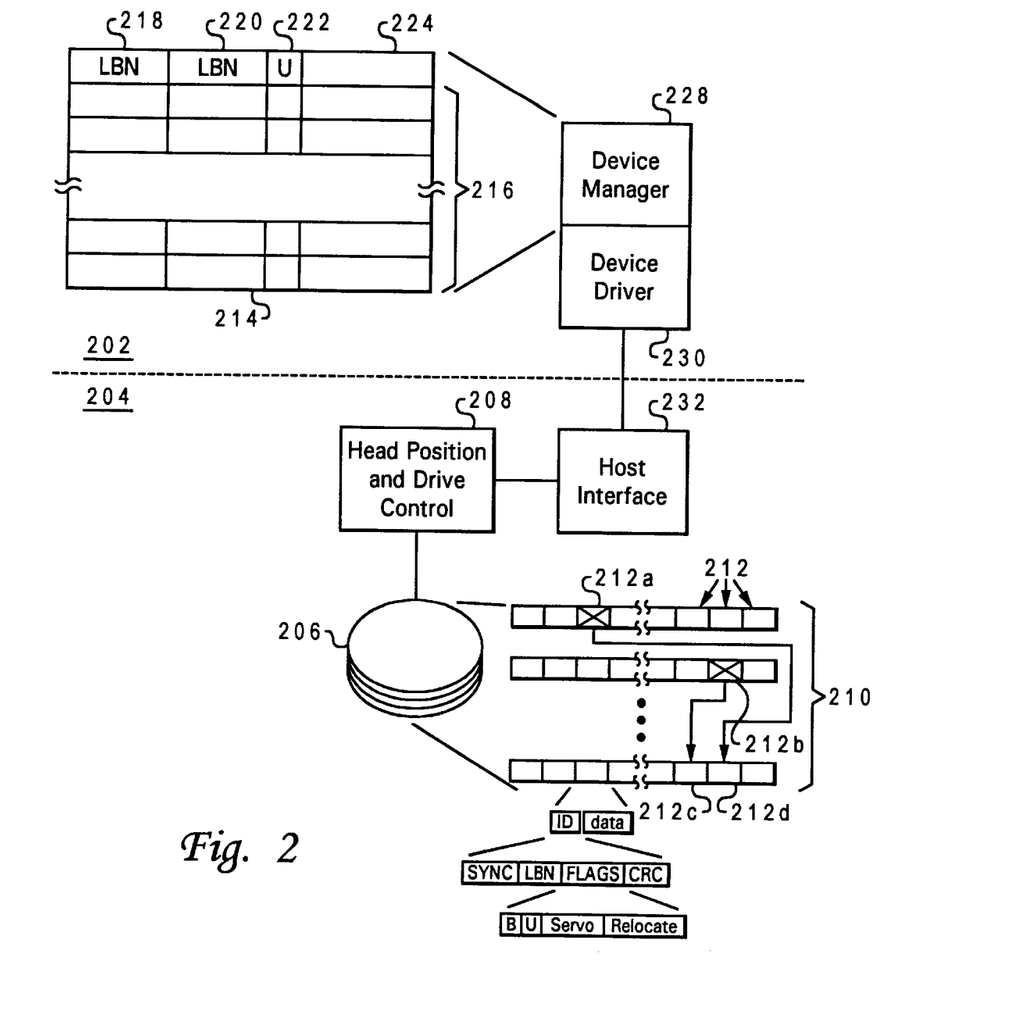
FIG. 2 is a diagram of a mechanism for replacing an unrecoverable sector with notification of the data status in accordance with a preferred embodiment of the present invention.

Referring to FIG. 2, a diagram of a mechanism for replacing an unrecoverable sector with notification of the data status in accordance with a preferred embodiment of the present invention is illustrated. The mechanism includes a host system 202, which may be data processing system 100 depicted in FIG. 1, and disk storage 204, such as nonvolatile storage 114 depicted in FIG. 1.

Disk storage 204 includes storage media 206, which is generally several magnetic storage disks spaced apart along a common central axis. In accordance with the known art, data is written to and read from storage media 206 by heads (not shown) positioned near storage media 206 as the disks are rotated by a drive motor (also not shown), with a separate head associated with each disk within storage media 206. The heads are moved in tandem over the surface of each respective disk within storage media 206, with the rotation of the disks and the position of the heads along a radius from the common axis controlled by head position and drive control logic 208.

Storage media 206 is logically divided into a number of tracks 210, which are generally arranged in concentric circles on the surface of the disks forming storage media 206. Each track 210 usually includes servo fields containing positioning information used to locate the head over a specific track, identification and synchronization fields, a data region, and error correcting codes (ECC). Because the servo, identification, synchronization, and ECC fields are not utilized by the present invention, only data regions for tracks 210 are illustrated in FIG. 2 for simplicity.

The data portion of each track is divided into a number of data sectors 212 (also referred to a "blocks") of a predetermined size and format. In the standard format, each sector 212 typically includes an identification (ID) field and a data field. Identification fields, in turn, generally include a synchronization field required for reading the data, a logical block number (LBN) assigned to the sector and employed by the addressing scheme of host system 202 to identify the sector, flags, and a cyclic redundancy check (CRC) character or similar error correcting codes (ECC). The flags may include a flag ("B") indicating whether the sector is good or bad, sector servo split flags, and a relocate pointer.

A defect map table 214, which may be maintained by storage media 204 and/or the operating system for host system 202, contains entries 216 for each LBN 218 where an error has been detected. Until an unrecoverable sector is identified for storage media 204, defect map table 214 will contain no entries. As unrecoverable sectors are identified over the life of storage media 204, entries are added to defect map table 214. When an unrecoverable sector is identified, the failed sector is mapped within defect map table 214 to a replacement sector previously reserved by the operating system for host system 202. Each entry 216 thus contains the LBN 220 which addresses a previously reserved replacement sector to which LBN 218 has been relocated, and may also contain a flag 222, described in further detail below, as well as other information 226 about the sector identified by LEN 218 within an entry 216.

When an unrecoverable sector—a sector from which valid data cannot be read despite repeated attempts—such as sectors 212a and 212b is identified during operation, the sector is remapped to a reserved spare or replacement sector 212c or 212d. The LBN 218 corresponding to the unrecoverable sector 212a or 212b is remapped to the LBN 220 of the corresponding replacement sector 212c or 212d, which may also be stored in the relocate pointer portion of an ID field for the appropriate unrecoverable sector 212a or 212b. During operation, the operating system for host 202 will check defect map table 214 prior to issuing a read request, and will substitute, for each LBN 218 in the read request within an entry 216 of defect map table 214, the LBN 220 of the replacement sector to which the failed sector has been relocated.

All disk drives can detect and report a bad data read from the disk media, typically through CRC errors. When CRC errors are returned from reading a sector, often the read may be retried successfully, and most file systems simply continue if the data was successfully recovered from the sector. Thus, a read request being handled by an operating system component 228 for storage disk 204 (often referred to as a "device manager" for disk 204) may encounter a CRC error returned from the device driver 230 for storage media 204, which receives the CRC error from host interface 232 of storage disk 204. The operating system component 228 will then attempt to recover the data within the sector being read by retrying the read request a predefined number of times.

When a CRC error is returned from reading a sector 212a previously identified as "good" and the data cannot be recovered by repetitively retrying the read request as described above, the failing sector 212a is relocated to a replacement sector 212d. Defect map table 214, which is accessible to operating system component 228, is appropriately updated.

The fact that an entry exists in defect map table 214 indicates that LBN 218 for that entry maps to a defective sector. In the present invention, an "unusable" bit or flag 224 associated with each entry 216 within defect map 218 indicates whether the corresponding replacement sector identified by LBN 220 contains bad data. Unusable bit 224 differs from "bad" bit or flag 222 of the type employed in the prior art in that the associated sector is not bad, only the data contained within the sector. A bad bit may optionally be set for failed sectors relocated in accordance with the present invention. However, this is not necessary since the presence of an entry within the defect map table 214 for a user sector implies that the sector is bad.

When reads are performed to a file containing a sector for which unusable bit 224 is set, operating system component 228 returns an error indicating bad data within the file. When replacement sector 212d for which unusable bit 224 has been set is written to or formatted, unusable bit 224 is cleared. Replacement sector 212d thus becomes a fully functional substitute for failed sector 212a which it replaced, since it now contains good data. Although the original data was not recovered, a bad sector was removed from use and a good sector substituted in its place for subsequent operations, with the status of data within the sector being identified to the user as unusable until the sector is overwritten with good data.

Figure 3:
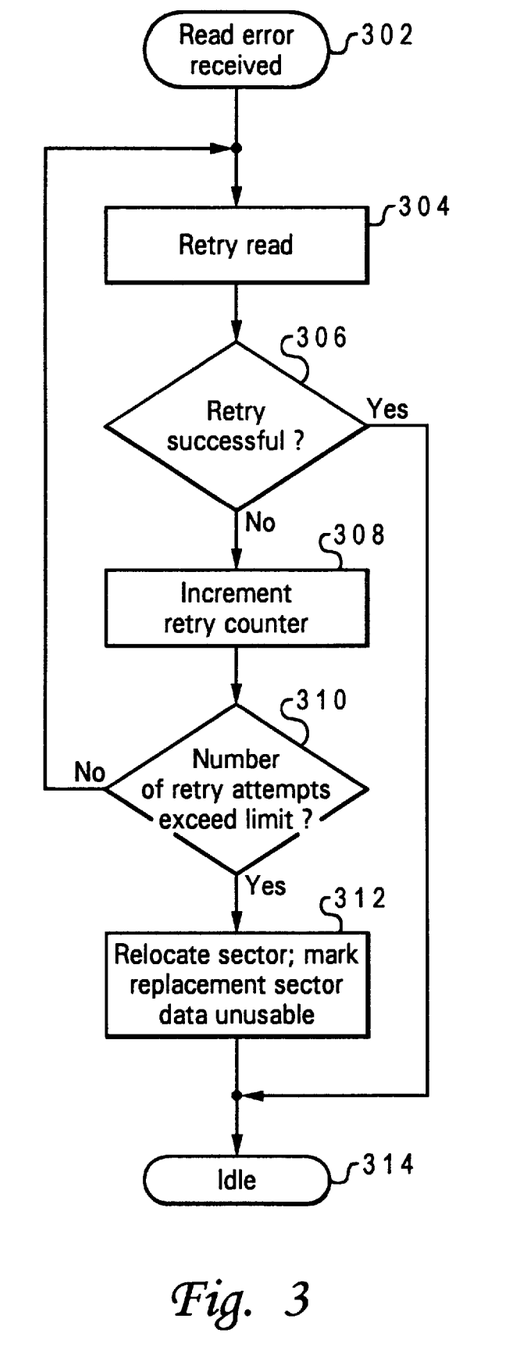
FIG. 3 depicts a high level flow chart for a process of relocating unreliable disk sectors when encountering disk drive read errors in accordance with a preferred embodiment of the present invention.

With reference now to FIG. 3, a high level flow chart for a process of relocating unreliable disk sectors when encountering disk drive read errors in accordance with a preferred embodiment of the present invention is depicted.

The process begins at step 302, which depicts a CRC read is error being returned by a disk drive to an operating system read request. The process first passes to step 304, which illustrates a retry of the read request by the operating system.

The process next passes to step 306, which depicts a determination of whether the retry request was successful. If not, the process proceeds to step 308, which illustrates incrementing a retry counter, and then to step 310, which depicts a determination of whether the number of retry attempts for the original read request has exceeded a predetermined limit, indicating that the data is not likely to be successfully recovered (e.g., ten or twenty). If not, the process returns to step 304 to repeat steps 304 through 310 again.

It should be noted that if the sector data is successfully read on a retry, the operating system may simply treat the sector as good. Alternatively; if the sector data is successfully read only after a predetermined number of retry attempts, indicating that the sector is failing (e.g., two to five), the sector may be relocated by the operating system to an operating system-reserved replacement sector with the recovered data. This latter alternative would prevent data from being lost in a failing sector.

The present invention, however, presumes that the sector data cannot be successfully recovered after a predetermined retry limit, a number of retry attempts which would indicate that the data is unlikely to be successfully recovered. If so, the process proceeds from step 310 to step 312, which illustrates relocating the sector on which the attempted read request failed and marking the replacement sector as containing unusable data by setting an unusable bit associated with the sector. The process then passes to step 314, which depicts the process becoming idle until the operating system receives another CRC read error.

Figure 4A:
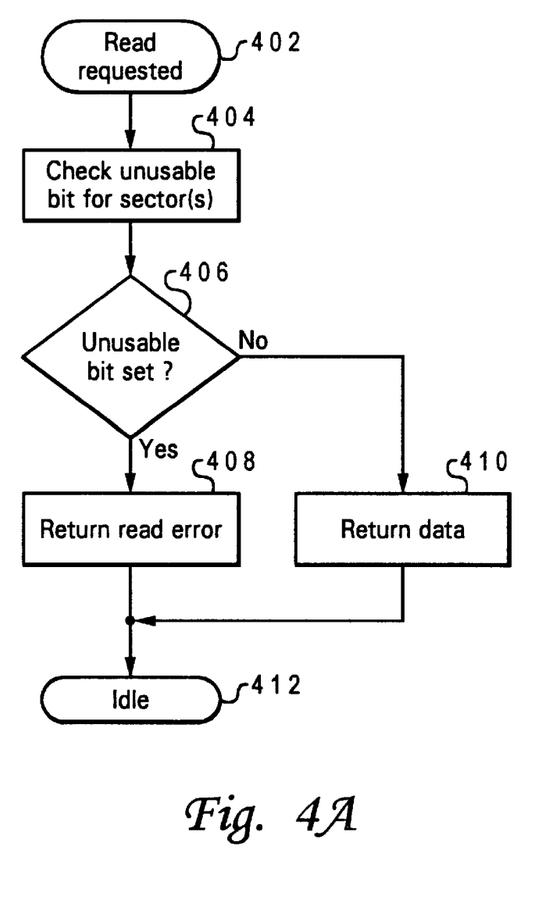
FIGS. 4A–4B are high level flow charts for processes of employing relocated disk sectors in accordance with a preferred embodiment of the present invention.
Figure 4B:
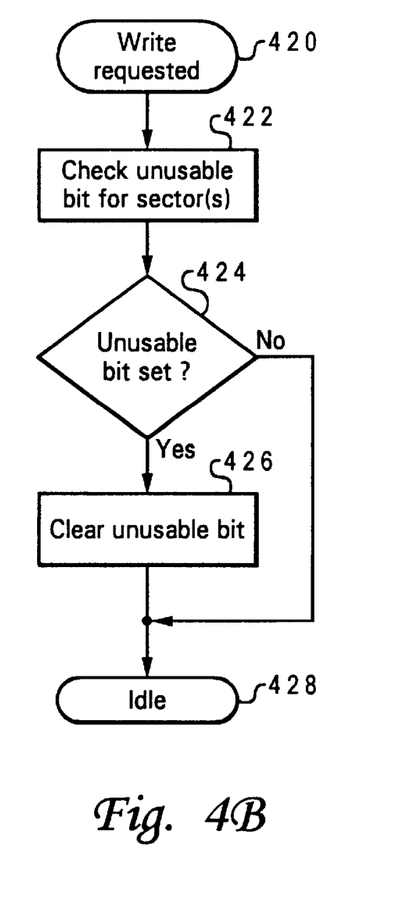

Referring to FIGS. 4A and 4B, high level flow charts for processes of employing relocated disk sectors in accordance with a preferred embodiment of the present invention are illustrated. FIG. 4A illustrates a read process to a replacement sector after relocation of a failed sector from which data could not be successfully recovered. The process begins at step 402, which depicts a read request being initiated on a replacement sector. The process then passes to step 404, which illustrates checking an unusable bit associated with the replacement sector.

The process next passes to step 406, which depicts a determination of whether the unusable bit is set. If so, the process proceeds to step 408, which depicts returning an read error to the operating system. If not, however, the process proceeds instead to step 410, which illustrates returning the data within the replacement sector to the operating system. From either of steps 408 or 410, the process passes to step 412, which illustrates the process becoming idle until another read request is initiated on a replacement sector.

FIG. 4B illustrates a write process on a replacement sector after relocation of a failed sector from which data could not be successfully recovered. The process begins at step 420, which depicts a write request being initiated on a replacement sector. The process then passes to step 422, which illustrates checking an unusable bit associated with the replacement sector.

The process next passes to step 424, which depicts a determination of whether the unusable bit is set. If so, the process proceeds to step 426, which depicts clearing the unusable bit. The data may also be written to the replacement sector. If the unusable bit associated with the replacement sector is not set, the process proceeds instead from step 424 to step 426, and the data may be written to the replacement sector without further processing. From steps 426, or from step 424 if the replacement sector unusable bit is not set, the process passes to step 428, which illustrates the process becoming idle until another write request is initiated on a replacement sector.

The present invention allows unrecoverable sectors to be replaced by spare sectors with notification to the system or user of the condition of data within the spare or replacement sector. An important aspect of the present invention is that it may be implemented within an operating system component, employed replacement sectors reserved by the operating system. This allows consistent handling of unrecoverable blocks regardless of the disk media or the capabilities of a disk drive which are involved.

Figure 5:
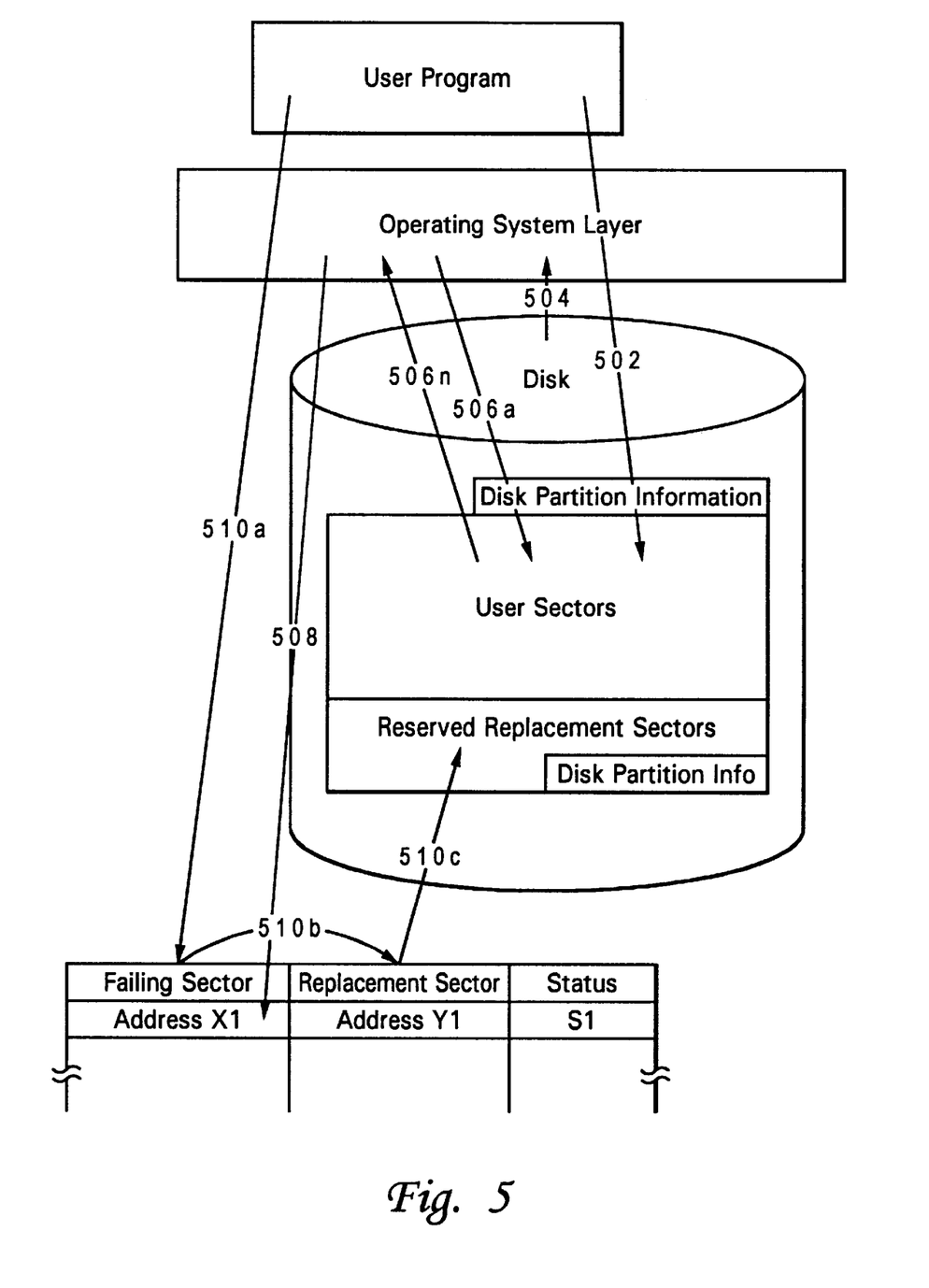
FIG. 5 depicts a data flow diagram for a process of detecting write errors and preserving user data despite failure of a disk to report write errors in accordance with a preferred embodiment of the present invention.

With reference now to FIG. 5, a data flow diagram for a process of detecting write errors and preserving user data despite failure of a disk to report write errors in accordance with a preferred embodiment of the present invention is depicted. FIG. 5 is a data flow diagram for a process of bad block relocation by an operating system.

When an operating system in accordance with the present invention is installed on a data processing system, and also at later times such as when a disk is added to the data processing system, the user is given the opportunity to create new data volumes which reside on disks within the system. A utility program allowing the user to enter information about the new volume creates the volumes within one or more partitions on a disk.

One volume feature which a user may specify is support, within the operating system, for relocation of bad blocks detected on disk media. When this feature is selected for a volume, the utility program will create an anchor block on the disk at a known location, such as at the very end of each partition making up the volume. The anchor block contains the addresses on the disk for a group of replacement sectors for that partition, reserved by the operating system. A table of addresses or a sized contiguous group of addresses starting at a known location, together with the number of replacement sectors reserved by the operating system, is stored in the anchor block.

The replacement sectors reserved by the operating system are invisible to the user, and cannot be utilized directly by the user. Prior to finishing creation of the volume, all replacement sectors are tested by the operating system to insure that, at least initially, these replacement sectors are good. During operation, the reserved replacement sectors are employed by the operating system to relocate failing user sectors.

FIG. 5 illustrates the flow of data and control for an operating system process of sector replacement on failing disk operations. A user program issues a disk access 502 to a sector or block of sectors within the user area of a disk partition. The disk drive returns an error 504 to the operating system on the attempted disk access.

If necessary, the operating system individually accesses 506a the sectors which were being accessed when the error was returned, monitoring any errors returned 506n for individual sectors to identify failing sectors within the group. The operating system thereby identifies failing sectors within the group of sectors. Alternatively, if only one sector was being written when the error was returned, these steps may be skipped.

For each failing sector identified, the operating system creates an entry 508 within a mapping table to provide a pretested, reserved replacement sector for subsequent storage of data directed to the failing sector. The entry created will include the address of the failing sector, a corresponding address of the replacement sector designated to substitute for the failing sector, and status information regarding the data within the replacement sector.

Subsequent disk accesses 510a to the failing sector result in a lookup 510b in the mapping table and are then directed 510c to the replacement sector. In this manner, the failing sector is relocated to a reserved replacement sector by the operating system, preferably with no loss of user data. This may be performed on top of, or in addition to, any data relocation performed by a disk drive upon detection of bad sectors.

In the particular case described above, there is no reliable data to put into the replacement sector. So the failing sector/replacement sector entry in the mapping table will be mark as "unusable" pending update of the existing data with fresh user data. By doing this, the original user data is lost (which was already the case), but the user application program will be notified of this fact and that sector will no longer be utilized in the file system.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links.

While the invention has been particularly shown and described with reference to a preferred embodiment, it will be understood by those skilled in the art that various is changes in form and detail may be made therein without departing from the spirit and scope of the invention.

What is claimed is:

1. A method of employing replacement sectors, comprising:
   receiving a read request for a replacement sector;
   checking an unusable bit associated with the replacement sector and indicating whether data within the replacement sector is good; and
   responsive to determining that the unusable bit associated with the replacement sector is set, returning an error.

2. The method of claim 1, further comprising:
   responsive to a write to a replacement sector having an associated unusable bit set, clearing the unusable bit.

3. A system for employing replacement sectors, comprising:
   a disk storage device including a replacement sector;
   an unusable bit indicating whether data within the replacement sector is good; and
   a processor coupled to the disk storage device and the unusable bit and executing a read process including:
   receiving a read request for the replacement sector;
   checking the unusable bit associated with the replacement sector to determine if data within the replacement sector is good; and
   responsive to determining that the unusable bit associated with the replacement sector is set, returning an error.

4. The system of claim 3, wherein the processor executes a write process including clearing the unusable bit responsive to a write to the replacement sector while the associated unusable bit is set.

5. A computer program product within a computer usable medium for employing replacement sectors, comprising:
   instructions, responsive to a read request for a replacement sector, for checking an unusable bit associated with a replacement sector and indicating whether data within the replacement sector is good;
   instructions, responsive to determining that the unusable bit associated with the replacement sector is set, for returning an error; and
   instructions, responsive to a write to a replacement sector having an associated unusable bit set, for clearing the unusable bit.

* * * * *

UNITED STATES PATENT AND TRADEMARK OFFICE
CERTIFICATE OF CORRECTION

PATENT NO. : 6,327,679 B1  
DATED : December 4, 2001  
INVENTOR(S) : Russell et al.

Page 1 of 1

It is certified that error appears in the above-identified patent and that said Letters Patent is hereby corrected as shown below:

<u>Column 1,</u>  
Line 15, delete the number "09/7283,366" and replace it with -- 09/283,366 --.

Signed and Sealed this

Twenty-third Day of April, 2002

Attest:

*Attesting Officer*

JAMES E. ROGAN  
*Director of the United States Patent and Trademark Office*